United States Patent
Shankar

(10) Patent No.: US 8,469,392 B2
(45) Date of Patent: Jun. 25, 2013

(54) COVER APPARATUSES AND AIRBAG MODULES WITH COVER APPARATUSES FOR FACILITATING ROUTING OF WIRE HARNESSES AND METHODS OF MAKING SUCH AIRBAG MODULES

(75) Inventor: Balaskandan Shankar, Salt Lake City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 122 days.

(21) Appl. No.: 13/154,975

(22) Filed: Jun. 7, 2011

(65) Prior Publication Data
US 2012/0313353 A1    Dec. 13, 2012

(51) Int. Cl.
*B60R 21/20*      (2006.01)

(52) U.S. Cl.
USPC ..................... 280/728.3; 280/728.2

(58) Field of Classification Search
USPC ................. 280/728.3, 728.2, 731, 732, 743.1
See application file for complete search history.

(56) References Cited

U.S. PATENT DOCUMENTS

| | | | | |
|---|---|---|---|---|
| 5,172,933 | A | * | 12/1992 | Strasser .................... 280/740 |
| 5,632,506 | A | * | 5/1997 | Shellabarger .............. 280/743.1 |
| 5,816,610 | A | | 10/1998 | Higashiura et al. |
| 5,833,266 | A | * | 11/1998 | Bartoldus et al. .......... 280/743.1 |
| 7,195,273 | B2 | | 3/2007 | Lewis et al. |
| 7,568,723 | B2 | | 8/2009 | Remley et al. |
| 2004/0239081 | A1 | | 12/2004 | Tredez |
| 2009/0102164 | A1 | * | 4/2009 | Eckert et al. .............. 280/728.1 |
| 2009/0250909 | A1 | | 10/2009 | Kuhne et al. |

* cited by examiner

*Primary Examiner* — Faye M. Fleming
(74) *Attorney, Agent, or Firm* — Madson IP, P.C.

(57) ABSTRACT

Cover apparatuses for use with airbag modules for facilitating routing of a wire harness away from an attachment point of the airbag module include a body member adapted to at least partially surround a portion of an inflator and an inflatable cushion. At least one stud aperture is positioned in an attachment side of the cover apparatus, and adapted to receive one or more mounting studs therethrough. A plurality of wire apertures are disposed in the cover apparatus away from the attachment side. Each wire aperture of the plurality of wire apertures is adapted to receive a wire harness therethrough. Methods of making inflatable airbag modules includes coupling an inflator with an inflatable cushion, disposing a cover apparatus around at least a portion of the inflatable cushion and inflator, and disposing a wire harness through the plurality of wire apertures in the cover apparatus.

20 Claims, 5 Drawing Sheets

COVER APPARATUSES AND AIRBAG MODULES WITH COVER APPARATUSES FOR FACILITATING ROUTING OF WIRE HARNESSES AND METHODS OF MAKING SUCH AIRBAG MODULES

TECHNICAL FIELD

The present disclosure relates generally to inflatable airbag protection systems for motor vehicles. More specifically, various embodiments of the present disclosure relate to devices, systems and methods used in positioning and/or routing a lead wire.

BACKGROUND

Modern motor vehicles typically employ various occupant protection systems that self-actuate from an undeployed to a deployed state without the need for intervention by the occupant. Such systems often include an inflatable occupant protection system in the form of a cushion or bag, commonly referred to as an "airbag cushion," which is now a legal requirement for many new vehicles. Such airbag cushions are typically installed in various locations in a vehicle and may deploy into one or more locations within the vehicle between the occupant and certain parts of the vehicle interior, such as the doors, steering wheel, instrument panel, dashboard or the like, to prevent or cushion the occupant from forcibly striking such parts of the vehicle interior.

Various types or forms of occupant protection systems have been developed or tailored to provide desired vehicle occupant protection based on either or both the position or placement of the occupant within the vehicle and the direction or nature of the vehicle collision. For example, driver and passenger inflatable cushion installations have found wide usage for providing protection to drivers and front seat passengers, respectively, in the event of a head-on type of collision. Other installations, such as side inflatable cushion installations, have found wide usage for providing protection to vehicle occupants in the event of a side impact (e.g., side collision, roll-over).

The airbag cushion is conventionally housed in an uninflated and folded condition to minimize space requirements. In the event of an accident, an accelerometer within the vehicle measures the abnormal deceleration and triggers the expulsion of rapidly expanding gases supplied or produced by a device commonly referred to as an "inflator." The expanding gases fill the airbags, which immediately inflate in front of the driver and/or passenger to protect them from impact against a windshield, dashboard, or other surfaces of the vehicle interior.

The electrical signal employed to trigger the expulsion of the rapidly expanding gases can be carried by a conventional conductor, such as a lead wire or wire harness that is connected to the inflator. In conventional occupant protection systems, such a wire harness can typically run within an airbag cover apparatus between the inflator and the folded airbag cushion. In some cases, the wire harness can become positioned along an attachment side of the occupant protection system. For example, during shipping, the wire harness can move around within the airbag cover apparatus between the inflator and the airbag cushion until it becomes located in the attachment area of the occupant protection system. When the wire harness moves in this manner, it can be pinched or otherwise compressed between, for example, the inflator and part of the motor vehicle to which the occupant protection system is installed (e.g., a seat frame, vehicle frame) as the occupant protection system is secured during installation.

BRIEF SUMMARY

Various embodiments of the present disclosure comprise a cover apparatus for use with an occupant protection system to position the wire harness away from the attachment means of the occupant protection system so that the wire harness does not become pinched between a portion of the occupant protection system and the motor vehicle when the occupant protection system is installed in the motor vehicle. In one or more embodiments, a cover apparatus for use with an occupant protection system, which includes an airbag cushion and an inflator, may comprise a body member adapted to at least partially surround at least a portion of an inflator and an inflatable cushion. At least one stud aperture may be positioned in an attachment side of the cover apparatus, the stud aperture being adapted to receive one or more mounting studs therethrough. A plurality of wire apertures may be located away from the attachment side of the cover apparatus and adapted to receive a wire harness therethrough.

Other embodiments of the present disclosure include inflatable airbag systems or modules. According to at least one embodiment, such inflatable airbag modules may comprise an inflatable cushion and an inflator in fluid communication with the inflatable cushion to provide a supply of inflation gas to the inflatable cushion during deployment. A cover apparatus may at least partially surround the inflatable cushion and the inflator. The cover apparatus may include at least one stud aperture adapted to receive one or more mounting studs of the inflator, where the at least one stud aperture is positioned in an attachment side of the inflatable airbag module. The cover apparatus may further include a plurality of wire apertures located away from the attachment side of the inflatable airbag module. A wire harness may be electrically coupled to the inflator and may extend through each of the plurality of wire apertures in the cover apparatus.

Additional embodiments of the present disclosure include methods for making an inflatable airbag module. One or more implementations of such methods may include coupling an inflator with an inflatable cushion so the inflator can provide a supply of inflation gas to the inflatable cushion during deployment. A cover apparatus may be disposed around at least a portion of the inflatable cushion and inflator. The cover apparatus may comprise at least one stud aperture positioned with one or more mounting studs extending there through, where the at least one stud aperture is positioned in an attachment side of the inflatable airbag module. The cover apparatus may further include a plurality of wire apertures located away from the attachment side of the inflatable airbag module. A wire harness may be disposed through each of the plurality of wire apertures in the cover apparatus.

BRIEF DESCRIPTION OF THE SEVERAL VIEWS OF THE DRAWINGS

Exemplary embodiments of the disclosure will become more fully apparent from the following description and appended claims, taken in conjunction with the accompanying drawings. Understanding that these drawings depict only exemplary embodiments and are, therefore, not to be considered limiting of the disclosure's scope, the exemplary embodiments of the disclosure will be described with additional specificity and detail through use of the accompanying drawings in which:

DETAILED DESCRIPTION

The illustrations presented herein are, in some instances, not actual views of any particular airbag cover apparatus or airbag module, but are merely idealized representations which are employed to describe various aspects of the present disclosure. Additionally, elements common between figures may retain the same numerical reference designation.

Figure 1:
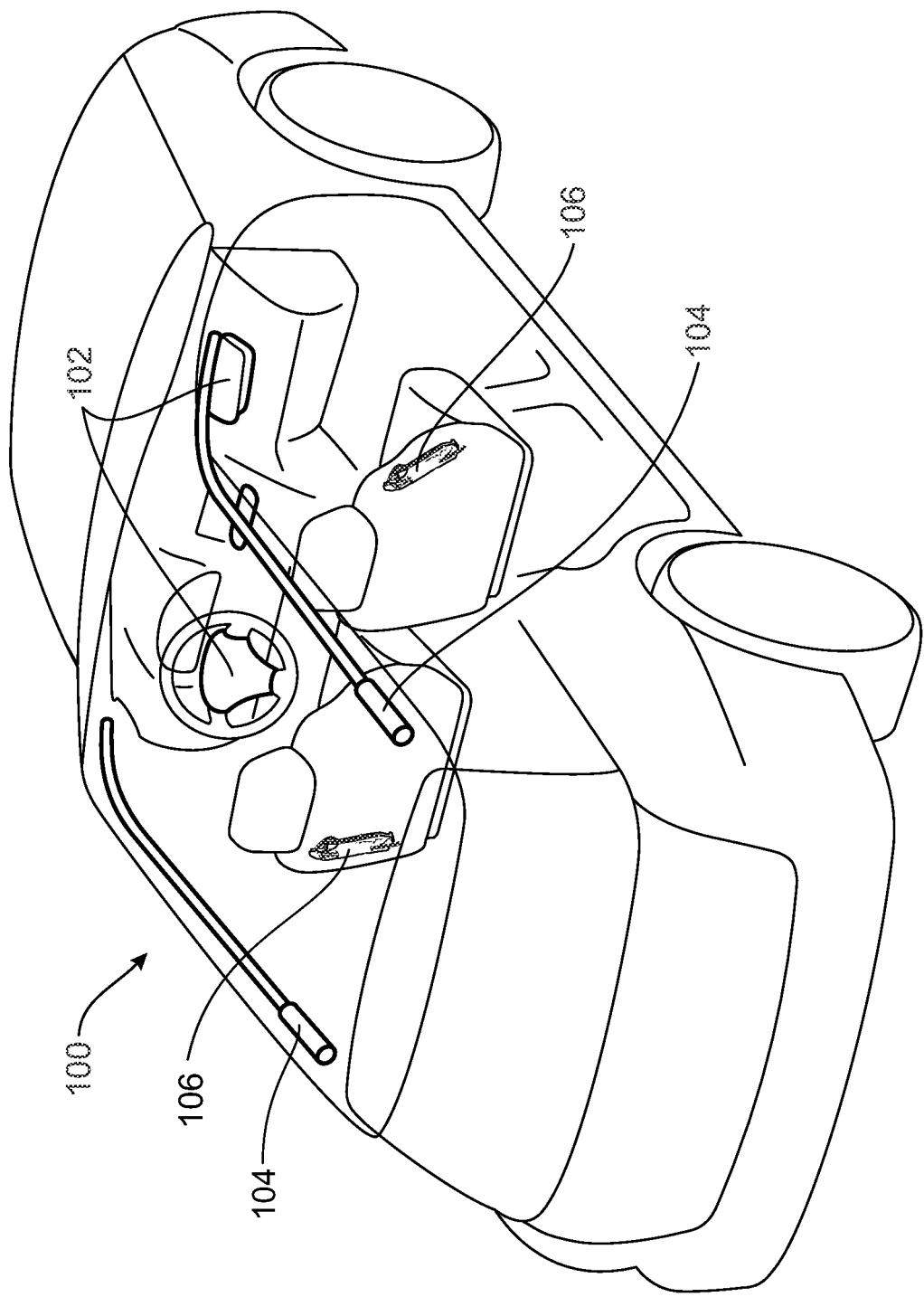
FIG. 1 is an isometric view illustrating an example of a motor vehicle comprising various airbag systems disposed therein.

Referring initially to FIG. 1, a motor vehicle 100 may include various inflatable airbag systems installed throughout the interior thereof. For example, a motor vehicle 100 may include driver and passenger airbag systems 102 for providing protection to drivers and front seat passengers, respectively, in the event of head-on type of collisions. In addition, a motor vehicle 100 may include side airbag systems for providing protection to vehicle occupants in the event of a side impact (e.g., side collision, roll-over). Such side airbag systems may include side curtain airbag modules 104 and side torso airbag modules 106. Side curtain airbag modules 104 are typically installed along a side portion of the vehicle's interior. Side torso airbag modules 106 (also referred to as side thorax/abdomen airbag modules) are typically installed in the seats of the motor vehicle 100.

Figure 2:
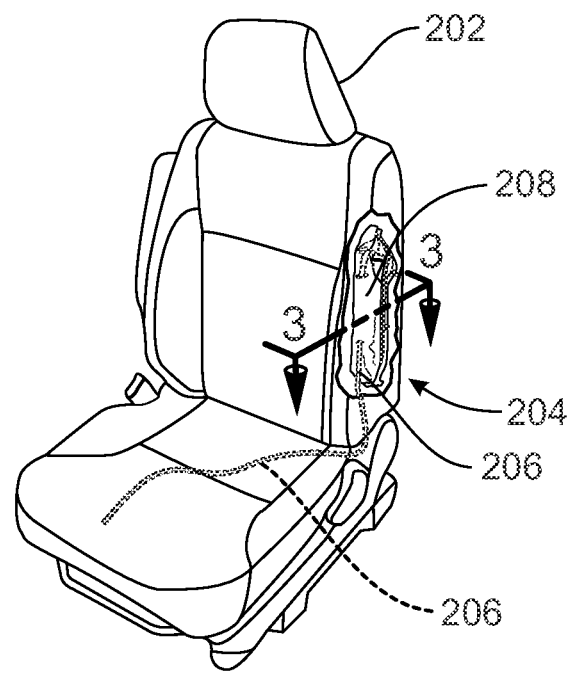
FIG. 2 is an isometric view showing an occupant seat comprising a side airbag module disposed within a portion of the seat

According to a feature of the present disclosure, side airbag modules can include a cover apparatus that is adapted to route a wire harness (or lead wire) along a defined path that is away from an attachment side of the side airbag module. Turning to FIG. 2, a seat 202 is shown that includes a side airbag module 204 configured as a side torso airbag module disposed within the seat 202. As illustrated, a wire harness 206 may extend through a cover apparatus 208 of the side airbag module 204 in a manner to position the wire harness 206 away from an attachment side of the side airbag module 204, as explained more fully below.

Figure 3:
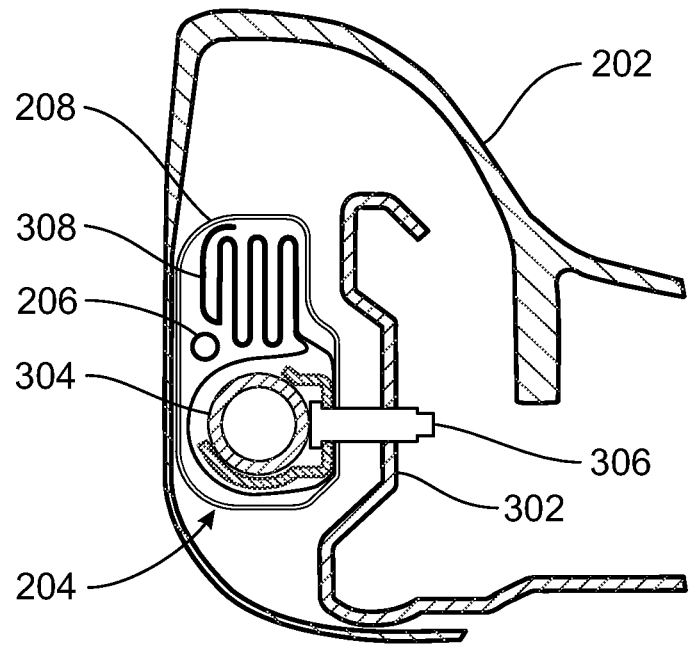
FIG. 3 is a cross-sectional view of the side airbag module disposed in the seat taken at section 3-3 in FIG. 2.

Turning to FIG. 3, a cross-sectioned view taken along section 3-3 in FIG. 2 is illustrated showing the side airbag module 204 coupled to a portion of a seat frame 302. As shown in FIG. 3, the side airbag module 204 includes an inflator 304 that is coupled to the seat frame 302 by mounting studs 306. The airbag module 204 further includes an inflatable cushion 308 coupled with the inflator 304 so that the inflatable cushion 308 can be inflated by rapidly expanding gases supplied or produced by the inflator 304 on deployment.

The cover apparatus 208 of the side airbag module at least partially houses the inflator 304 and the inflatable cushion 308. The mounting studs 306 of the inflator 304 extend through the cover apparatus 208 so they can be coupled (e.g., bolted) to the seat frame 302. Accordingly, the cover apparatus 208 may include at least one stud aperture (e.g., stud apertures 404 shown in FIG. 4) through which the mounting studs 306 can extend. The cover apparatus 208 also includes two or more wire apertures (e.g., wire apertures 406 shown in FIG. 4) adapted to route the wire harness 206 through at least a portion of the cover apparatus 208.

As shown in FIG. 3, the wire harness 206 is routed through at least a portion the cover apparatus 208 so that the wire harness 206 is positioned away from the attachment side of the side airbag module 204 (e.g., away from the mounting studs 306 of the inflator 304). In the example shown in FIG. 3, the wire harness 206 is routed inside the cover apparatus 208 between the cover apparatus 208 and the inflatable cushion 308, and is positioned substantially opposite from the attachment side of the side airbag module 204. With the wire harness 206 routed through the cover apparatus 208 at a position away from the attachment side of the side airbag module 204, the wire harness 206 is not be trapped or compressed between the side airbag module 204 and the seat frame 302 (e.g., between the inflator 304 and the seat frame 302).

Figure 4:
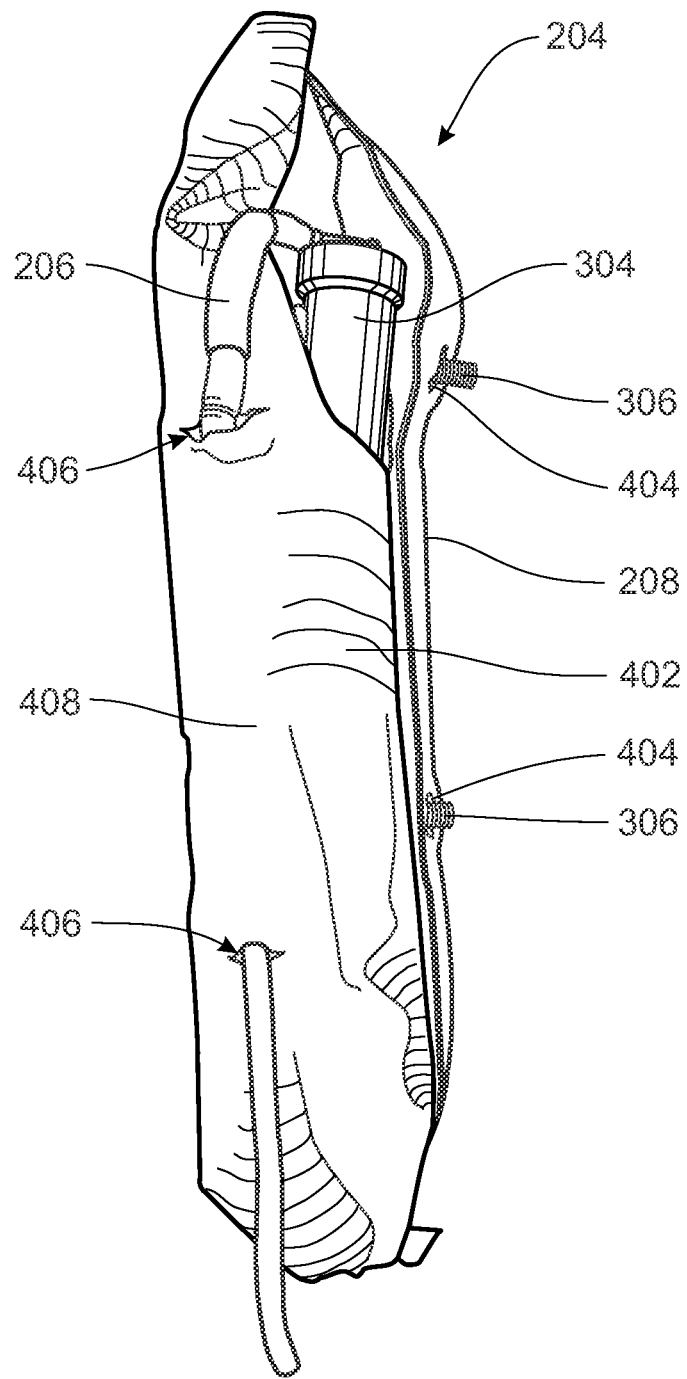
FIG. 4 shows two elevation views of different angles of a side airbag module according to at least one embodiment.

FIG. 4 shows two elevation views of different angles of the side airbag module 204 according to at least one embodiment. As illustrated, the side airbag module 204 includes a cover apparatus 208 at least partially housing an inflator 304 and an inflatable cushion (not shown in FIG. 4). The cover apparatus 208 includes a body member 402 that surrounds (or at least partially surrounds) the inflator 304 and the inflatable cushion 308 (as seen in FIG. 3). According to various embodiments, the body member 402 can comprise a rigid or substantially rigid material, while in other embodiments the body member 402 can comprise a soft or flexible material. In at least some embodiments, a body member 402 comprising a soft or flexible material may be formed from a fabric material such as, by way of example and not limitation, a non-woven polypropylene material or a woven nylon material with or without a silicone coating. Such a fabric material can be wrapped and secured around at least a portion of the inflator 304 and the inflatable cushion 308 (see FIG. 3). The cover apparatus 208 is configured to allow the deployment of the inflatable cushion 308 on inflation by rapidly expanding inflation gases.

The cover apparatus 208 further includes one or more stud apertures 404 adapted to receive mounting studs 306 therethrough. In some embodiments, the cover apparatus 208 can include just a single stud aperture 404 comprising a slot-shaped aperture that is sized and shaped so that all of the mounting studs 306 can extend therethrough. In other embodiments, the cover apparatus 208 can include a plurality of stud apertures 404, such as one stud aperture 404 for each mounting stud 306. The side or portion of the cover apparatus 208 through which the mounting studs 306 extend may comprise the attachment side of the side airbag module 204.

The cover apparatus 208 also includes two or more wire apertures 406 adapted to receive the wire harness 206 therethrough. The wire apertures 406 are positioned in the cover apparatus 208 so they are located away from the attachment side of the side airbag module 204. In at least some embodiments, the wire apertures 406 may be positioned in a surface or area of the cover apparatus 208 at least substantially opposite from a surface or area of the one or more stud apertures 404.

As previously noted, the side or portion of the cover apparatus 208 through which the mounting studs 306 extend can comprise the attachment side of the side airbag module 204. In general, the side of the side airbag module 204 that is attached to and/or compressed against a portion of the motor vehicle (such as the seat frame) when installed comprises the attachment side. Referring back to FIG. 3, for example, the attachment side of the embodiment of the side airbag module 204 depicted in FIG. 3 can comprise those surfaces facing toward the seat frame 302, in the case of a rigid cover apparatus 208, since such surfaces will be compressed against the seat frame 302 when installed. In the case of a soft or flexible cover apparatus 208, the attachment side of the side airbag module 204 may be only those areas sufficiently near to the mounting studs 306 that a wire harness extending through the attachment side would be compressed between the seat frame 302 and a portion or component of the side airbag module 204, such as between the seat frame 302 and the inflator 304.

The positioning of the two or more wire apertures 406 can also aid in inhibiting the wire harness 206 from disconnecting from the inflator 304. For example, the wire apertures 406 can inhibit the wire harness from being pulled or otherwise forced away from the inflator 304, which can result in wire connection failure of the side airbag module 204.

Figure 5:
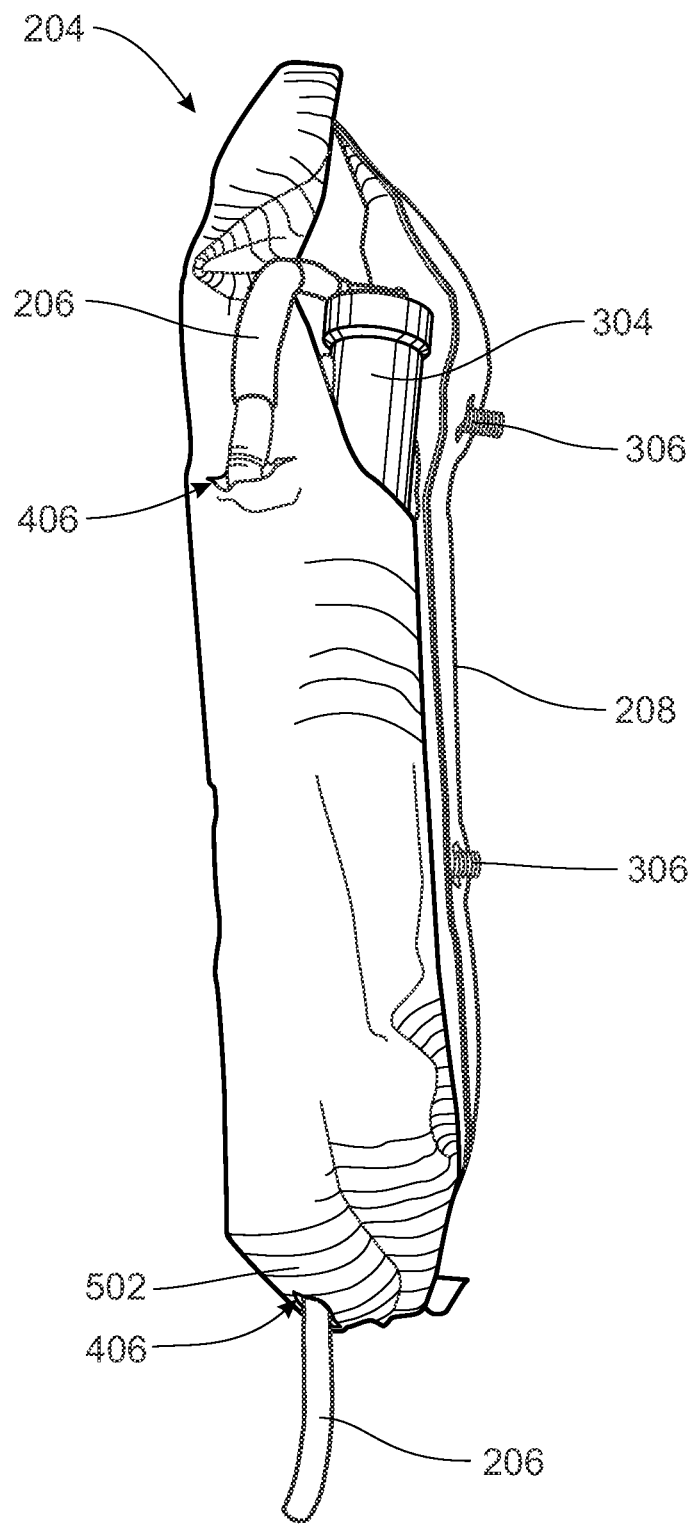
FIG. 5 shows an elevation view of a side airbag module according to at least one other embodiment.

Referring back to FIG. 4, the two or more wire apertures 406 can be disposed in a longitudinal side surface 408 of the cover apparatus 208 in some embodiments. In such embodiments, the wire harness 206 may extend along an exterior portion of the side surface of the cover apparatus 208, enter into a wire aperture 406, extend along an interior portion of the side surface of the cover apparatus 208 and then exit from the cover apparatus 208 through a second wire aperture 406. In other embodiments, at least one of the wire apertures 406 can be disposed in an end surface of the cover apparatus 208. For example, referring to FIG. 5, a wire aperture 406 can be disposed in a bottom surface 502 (or longitudinal end surface) of the cover apparatus 208, with the wire harness 206 entering through the wire aperture 406 in the bottom surface 502 and exiting through a wire aperture 406 in a side surface, as shown in FIG. 5. It will be apparent to those of ordinary skill in the art that other configurations are possible, such as a wire aperture 406 located in a side surface and another wire aperture 406 located in a top surface, or wire apertures 406 located in both top and bottom surfaces, etc. Furthermore, various embodiments of the present disclosure may employ more than two wire apertures 406.

Figure 6:
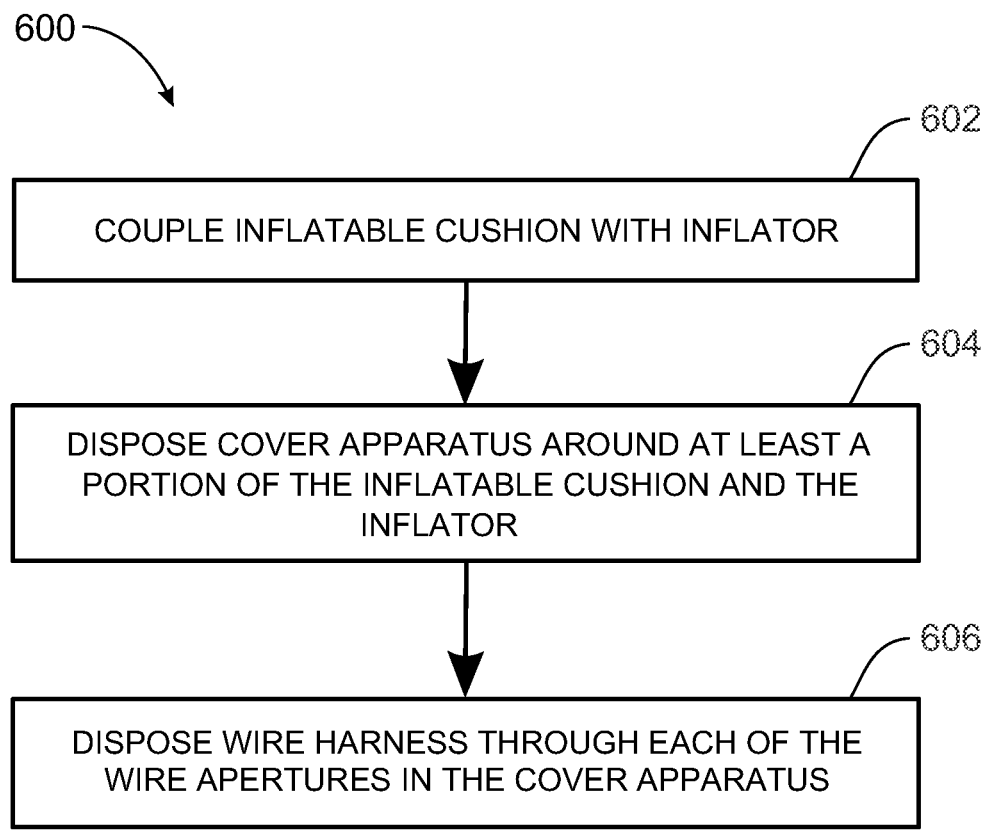
FIG. 6 is a flow diagram illustrating at least one embodiment of a method for forming an airbag module.

Additional embodiments of the present disclosure relate to methods of making cover apparatuses and airbag modules including such cover apparatuses. FIG. 6 is a flow diagram illustrating at least one implementation of a method 600 for making an airbag module. For example, referring to FIGS. 3-6, an inflatable cushion 308 can be coupled with an inflator 304 at step 602. The inflatable cushion 308 can be coupled with the inflator 304 in such a manner that the inflator 304 can provide a supply of inflation gas to the inflatable cushion 308 during deployment.

At step 604, a cover apparatus 208 can be disposed or arranged around at least a portion of the inflatable cushion 308 and the inflator 304. The cover apparatus 208 can be formed with at least one stud aperture 404 and a plurality of wire apertures 406. In at least one implementation of the method 600, the attachment studs 306 of the inflator 304 can be disposed through the one or more stud apertures 404 of the cover apparatus 208. The cover apparatus 208 can be formed from a rigid or flexible material, and in some implementations may be made from a fabric material. The wire apertures 406 can be formed in the cover apparatus 208 away from an attachment side of the cover apparatus 208. For example, the wire apertures 406 can be formed in the cover apparatus 208 at least substantially opposite from the one or more stud apertures 404. In some embodiments, at least one of the wire apertures 406 can be formed in a side surface of the cover aperture. In some embodiments, at least one wire aperture 406 can be formed in a surface at a longitudinal end of the cover apparatus 208.

At step 606, a wire harness is disposed through each of the wire apertures 406 of the cover apparatus 208. For example, the wire harness 206 can be disposed to extend through each of the wire apertures 406 of the cover apparatus 208. The wire harness 206 can be coupled to the inflator 304 to provide an electrical connection through which a signal can be transmitted to the inflator 304 to initiate deployment of the airbag module.

The various embodiments and implementations of the present disclosure result in cover apparatuses and airbag modules adapted to keep a wire harness from becoming pinched or compressed between the airbag module and a portion of a motor vehicle when the airbag module is installed.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A cover apparatus for use with an occupant protection system including an inflatable cushion and an inflator, the cover apparatus comprising:
    a body member having an attachment side and a longitudinal side surface located away from the attachment side, the body member adapted to at least partially surround at least a portion of the inflator and the inflatable cushion;
    at least one stud aperture adapted to receive one or more mounting studs therethrough, the at least one stud aperture being positioned in the attachment side of the body member; and
    a plurality of wire apertures, at least one of the plurality of wire apertures being disposed in the longitudinal side surface to receive a wire harness therethrough, wherein the wire harness is routed along a defined path away from the attachment side, the wire harness is coupled to the inflator and extends along an exterior portion of the longitudinal side surface, enters one of the plurality of wire apertures, extends along an interior portion of the longitudinal side surface, and exits the body member through another of the plurality of wire apertures.

2. The cover apparatus of claim 1, wherein the body member comprises a flexible material.

3. The cover apparatus of claim 2, wherein the body member comprises a fabric material.

4. The cover apparatus of claim 1, wherein the plurality of wire apertures are located at least substantially opposite from the at least one stud aperture.

5. The cover apparatus of claim 1, wherein the occupant protection system is a side torso airbag module and the one or more mounting studs are attachable to a seat frame.

6. The cover apparatus of claim 1, wherein at least one wire aperture is located in a longitudinal end surface of the cover apparatus.

7. A side torso airbag module, comprising:
    an inflatable cushion;
    an inflator in fluid communication with the inflatable cushion to provide a supply of inflation gas to the inflatable cushion during deployment;
    a cover apparatus having an attachment side and a longitudinal side surface located away from the attachment side, the cover apparatus at least partially surrounding the inflatable cushion and the inflator, the cover apparatus including:

at least one stud aperture adapted to receive one or more mounting studs of the inflator, the mounting studs being attachable to a seat frame the at least one stud aperture being positioned in an attachment side of the inflatable airbag module; and a plurality of wire apertures, at least one of the plurality of wire apertures being disposed in the longitudinal side surface; and a wire harness electrically coupled to the inflator and extending along a defined path away from the attachment side, the wire harness is coupled to the inflator and extends along an exterior portion of the longitudinal side surface, enters one of the plurality of wire apertures, extends along an interior portion of the longitudinal side surface, and exits the cover apparatus through another of the plurality of wire apertures.

8. The inflatable airbag module of claim 7, wherein the cover apparatus comprises a flexible material.

9. The inflatable airbag module of claim 8, wherein the cover apparatus comprises a fabric material.

10. The inflatable airbag module of claim 7, wherein the plurality of wire apertures in the cover apparatus are located at least substantially opposite from the at least one stud aperture in the cover apparatus.

11. The inflatable airbag module of claim 7, wherein the wire harness extends from a coupling with the inflator exterior to the cover apparatus before the wire harness enters one of the plurality of wire apertures.

12. The inflatable airbag module of claim 7, wherein at least one wire aperture is located in a surface at a longitudinal end of the cover apparatus.

13. The inflatable airbag module of claim 7, wherein a portion of the wire harness extends between the cover apparatus and the inflatable cushion.

14. A method of making an inflatable airbag module, the method comprising:

coupling an inflator with an inflatable cushion so the inflator provides a supply of inflation gas to the inflatable cushion during deployment;

disposing a cover apparatus having an attachment side and a longitudinal side surface located away from the attachment side around at least a portion of the inflatable cushion and inflator, the cover apparatus comprising:

at least one stud aperture positioned with one or more mounting studs extending therethrough, the at least one stud aperture being positioned in the attachment side of the inflatable airbag module; and a plurality of wire apertures disposed in the cover apparatus;

coupling a wire harness to the inflator; and disposing the wire harness through the plurality of wire apertures in the cover apparatus by extending the wire harness along a defined path away from the attachment side such that the wire harness extends along an exterior portion of the longitudinal side surface, enters one of the plurality of wire apertures, extends along an interior portion of the longitudinal side surface, and exits the cover apparatus through another of the plurality of wire apertures.

15. The method of claim 14, further comprises:

forming the cover apparatus from a flexible material.

16. The method of claim 15, wherein forming the cover apparatus from a flexible material comprises:

forming the cover apparatus from a fabric material.

17. The method of claim 14, further comprising:

forming the plurality of wire apertures in the cover apparatus at least substantially opposite from the at least one stud aperture in the cover apparatus.

18. The method of claim 14, further comprising:

inhibiting the disconnection of the wire harness from the inflator by positioning the plurality of wire apertures to inhibit pulling force on the wire harness.

19. The method of claim 14, further comprising:

forming at least one wire aperture in a surface at a longitudinal end of the cover aperture.

20. The method of claim 14, further comprising:

disposing a portion of the wire harness between the cover apparatus and the inflatable cushion.

* * * * *